(12) United States Patent
Kolb

(10) Patent No.: US 8,783,666 B2
(45) Date of Patent: Jul. 22, 2014

(54) SPRUNG MULTIPOINT MOUNTING FOR VEHICLE SEAT WITH ELASTOMER SPRING ELEMENT

(75) Inventor: Jens Kolb, Königstein (DE)

(73) Assignee: Grammer AG, Amberg (DE)

(*) Notice: Subject to any disclaimer, the term of this patent is extended or adjusted under 35 U.S.C. 154(b) by 168 days.

(21) Appl. No.: 13/230,713

(22) Filed: Sep. 12, 2011

(65) Prior Publication Data

US 2012/0086159 A1    Apr. 12, 2012

(30) Foreign Application Priority Data

Sep. 13, 2010 (DE) .......................... 10 2010 045 115
Dec. 15, 2010 (DE) .......................... 10 2010 054 752

(51) Int. Cl.
A47C 7/14 (2006.01)
F16F 1/373 (2006.01)

(52) U.S. Cl.
USPC ....................... 267/133; 267/140.11; 267/141

(58) Field of Classification Search
USPC .............. 267/131, 133, 136, 140.11, 140.13, 267/141; 248/619, 621, 632; 297/344.1, 297/344.11; 296/190.07
See application file for complete search history.

(56) References Cited

U.S. PATENT DOCUMENTS

| | | |
|---|---|---|
| 2,118,456 A | 5/1938 | Whedon |
| 3,300,203 A | 1/1967 | Carter et al. |
| 3,752,432 A | 8/1973 | Lowe |
| 4,151,973 A | 5/1979 | Sedlock |
| 4,213,594 A | 7/1980 | Pietsch et al. |
| 4,286,765 A | 9/1981 | Delgleize et al. |
| 4,350,317 A | 9/1982 | Aondetto |
| 4,408,744 A | 10/1983 | Thompson |
| 4,451,079 A * | 5/1984 | Takahashi ................ 296/190.07 |
| 4,477,050 A | 10/1984 | Thompson et al. |
| 4,573,657 A | 3/1986 | Sakamoto |
| 4,645,169 A | 2/1987 | Mischer |
| 4,679,760 A | 7/1987 | Dotzler et al. |
| 4,684,100 A | 8/1987 | Grassl |
| 4,729,539 A | 3/1988 | Nagata |
| 4,773,671 A | 9/1988 | Inagaki |
| 4,784,434 A | 11/1988 | Iwami |

(Continued)

FOREIGN PATENT DOCUMENTS

| | | |
|---|---|---|
| CN | 100493951 C | 6/2009 |
| DE | 1 898 307 U | 8/1964 |

(Continued)

OTHER PUBLICATIONS

Extended European Search Report for European Patent Application No. 12 15 9863, dated Jul. 4, 2012.

(Continued)

*Primary Examiner* — Thomas J Williams
(74) *Attorney, Agent, or Firm* — Lathrop & Gage LLP

(57) ABSTRACT

The invention concerns a vehicle oscillation device (1) comprising a sprung multipoint mounting (4) arranged between a vehicle seat (2) or driver's cab and a base element (3) of a vehicle arranged below and suitable for rotative springing and/or damping of the vehicle seat (2) and/or driver's cab in relation to the base element (3), wherein the sprung multipoint mounting (4) is formed of several pieces and comprises at least one fluid spring element and/or fluid damping element (5) and at least one elastomer spring element (6).

13 Claims, 7 Drawing Sheets

(56) References Cited

U.S. PATENT DOCUMENTS

Figure 1:
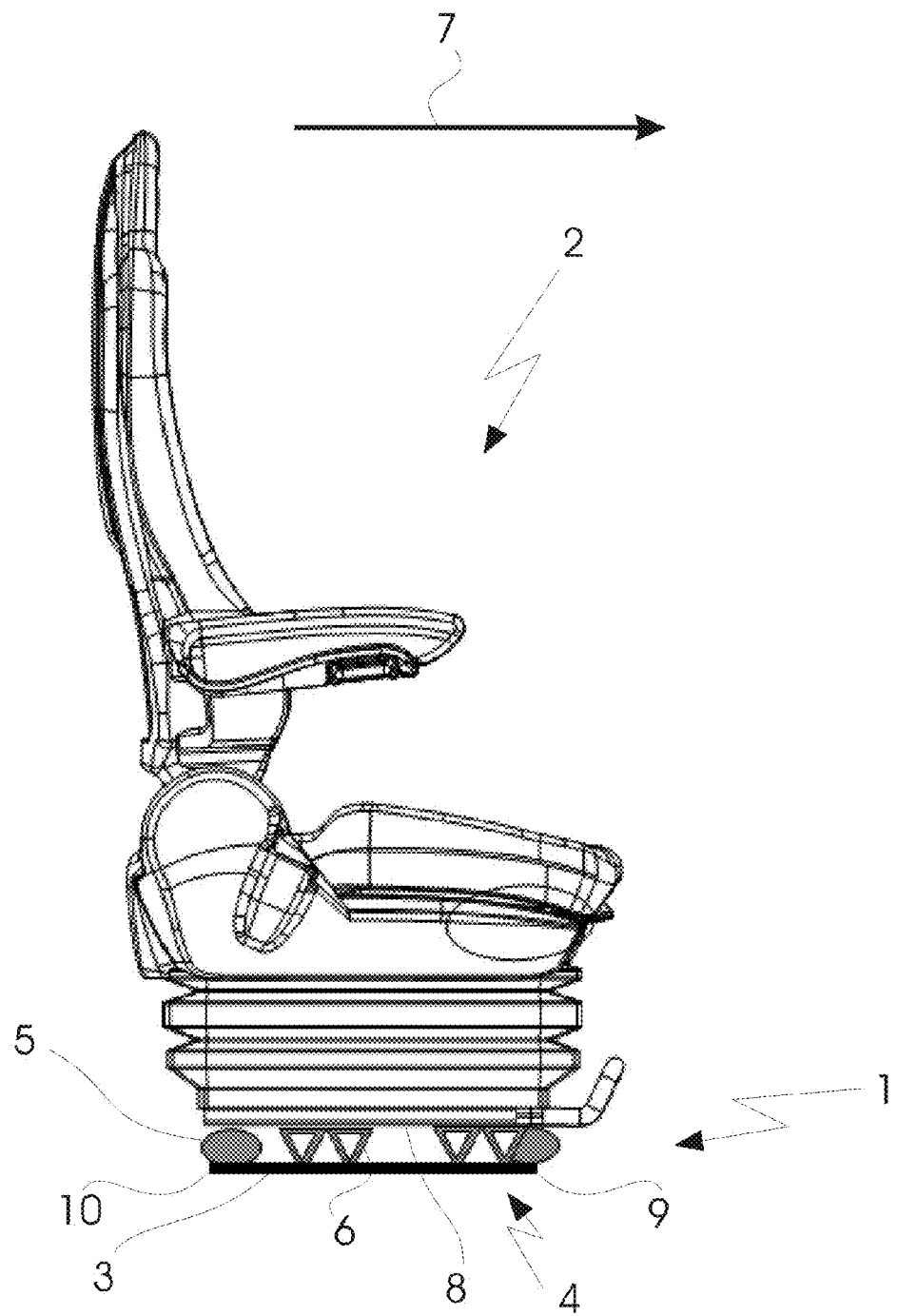

| | | |
|---|---|---|
| 4,856,763 A | 8/1989 | Brodersen et al. |
| 4,943,037 A | 7/1990 | Brodersen et al. |
| 4,993,778 A | 2/1991 | Colin et al. |
| 5,058,852 A | 10/1991 | Meier et al. |
| 5,125,631 A | 6/1992 | Brodersen et al. |
| 5,211,369 A | 5/1993 | Hoemer |
| 5,251,864 A | 10/1993 | Itou |
| 5,364,060 A | 11/1994 | Donovan et al. |
| 5,521,821 A | 5/1996 | Shimizu et al. |
| 5,533,703 A | 7/1996 | Grassl et al. |
| 5,553,911 A | 9/1996 | Bodin et al. |
| 5,582,385 A | 12/1996 | Boyle et al. |
| 5,735,509 A | 4/1998 | Gryp et al. |
| 5,765,802 A | 6/1998 | Bostrom et al. |
| 5,791,738 A | 8/1998 | Niezoldt |
| 5,794,911 A | 8/1998 | Hill |
| 5,871,198 A | 2/1999 | Bostrom et al. |
| 5,957,426 A | 9/1999 | Brodersen |
| 5,967,604 A | 10/1999 | Yoshida et al. |
| 5,971,116 A | 10/1999 | Franklin |
| 6,042,093 A * | 3/2000 | Garelick .................. 267/131 |
| 6,340,201 B1 | 1/2002 | Higuchi |
| 6,478,102 B1 * | 11/2002 | Puterbaugh et al. ..... 296/190.07 |
| 6,543,755 B2 * | 4/2003 | Monson et al. ............. 267/136 |
| 6,616,116 B1 | 9/2003 | Rochau et al. |
| 6,637,735 B2 * | 10/2003 | Monson et al. ............. 267/141 |
| 6,763,550 B2 | 7/2004 | Regnier |
| 6,802,408 B2 | 10/2004 | Krammer |
| 7,044,553 B2 | 5/2006 | Ropp |
| 7,152,839 B2 | 12/2006 | Mullinix et al. |
| 7,168,671 B2 | 1/2007 | Bostrom et al. |
| 7,185,867 B2 | 3/2007 | Hill et al. |
| 7,712,836 B2 | 5/2010 | Deml |
| 7,810,884 B2 | 10/2010 | Lorey et al. |
| 7,886,882 B2 | 2/2011 | Behmenburg et al. |
| 7,942,248 B2 | 5/2011 | St. Clair et al. |
| 8,118,287 B2 | 2/2012 | Schordine |
| 2001/0035600 A1 | 11/2001 | St. Clair |
| 2002/0011699 A1 | 1/2002 | St. Clair |
| 2006/0278805 A1 | 12/2006 | Haller |
| 2007/0278723 A1 | 12/2007 | Shoemaker et al. |
| 2008/0000738 A1 | 1/2008 | Zdeb |
| 2008/0000739 A1 | 1/2008 | Behmenburg et al. |
| 2008/0088165 A1 | 4/2008 | Deml |
| 2008/0156602 A1 | 7/2008 | Hiemenz et al. |
| 2008/0197684 A1 | 8/2008 | Ott et al. |
| 2009/0134595 A1 | 5/2009 | Haller et al. |
| 2009/0179390 A1 | 7/2009 | Wurmthaler et al. |
| 2009/0184448 A1 | 7/2009 | Hiser |
| 2009/0256293 A1 | 10/2009 | Ward |
| 2009/0283944 A1 | 11/2009 | Schordine |
| 2010/0052356 A1 | 3/2010 | Lewis, II |
| 2010/0072800 A1 | 3/2010 | Weber et al. |
| 2010/0102493 A1 | 4/2010 | Deml et al. |
| 2010/0117428 A1 | 5/2010 | Deml et al. |
| 2011/0001033 A1 | 1/2011 | Kohl et al. |
| 2011/0001342 A1 | 1/2011 | Deml et al. |
| 2011/0022265 A1 | 1/2011 | Sekiya |
| 2011/0226930 A1 | 9/2011 | Enns et al. |
| 2011/0278894 A1 | 11/2011 | Lorey |
| 2012/0025577 A1 | 2/2012 | Kolb |
| 2012/0043798 A1 | 2/2012 | Haller et al. |
| 2012/0049421 A1 | 3/2012 | Haller et al. |
| 2012/0086159 A1 | 4/2012 | Kolb |
| 2012/0090930 A1 | 4/2012 | Haller |
| 2012/0091773 A1 | 4/2012 | Lorey |
| 2012/0126592 A1 | 5/2012 | Kaessner et al. |
| 2012/0153689 A1 | 6/2012 | Haller et al. |
| 2012/0153695 A1 | 6/2012 | Haller et al. |
| 2012/0187615 A1 | 7/2012 | Haller et al. |

FOREIGN PATENT DOCUMENTS

| | | |
|---|---|---|
| DE | 15 55 056 | 3/1970 |
| DE | 19 16 403 A1 | 10/1970 |
| DE | 21 13 579 | 10/1972 |
| DE | 28 06 247 C2 | 8/1979 |
| DE | 28 11 034 A1 | 9/1979 |
| DE | 28 51 129 A1 | 6/1980 |
| DE | 32 42 287 A1 | 5/1984 |
| DE | 35 17 345 A1 | 11/1986 |
| DE | 35 17 345 C2 | 11/1986 |
| DE | 38 24 272 A1 | 3/1990 |
| DE | 41 01 221 A1 | 7/1992 |
| DE | 696 06 732 T2 | 4/1995 |
| DE | 197 56 252 A1 | 7/1998 |
| DE | 197 41 602 A1 | 3/1999 |
| DE | 603 20 456 T2 | 12/2002 |
| DE | 699 08 290 T2 | 5/2004 |
| DE | 699 082 90 | 5/2004 |
| DE | 10 2005 028 725 | 1/2006 |
| DE | 10 2005 028 725 A1 | 1/2006 |
| DE | 10 2006 016 047 B3 | 4/2006 |
| DE | 10 2005 003 833 | 6/2006 |
| DE | 10 2005 011 856 B3 | 8/2006 |
| DE | 10 2007 030 467 A1 | 1/2009 |
| DE | 10 2008 016 685 B3 | 6/2009 |
| DE | 10 2008 010 719 A1 | 8/2009 |
| DE | 10 2008 045 492 A1 | 3/2010 |
| DE | 10 2008 052 960 | 4/2010 |
| DE | 10 2008 056 200 A1 | 5/2010 |
| DE | 10 2009 020 034 A1 | 11/2010 |
| DE | 10 2009 040 010 A1 | 1/2011 |
| EP | 0 054 880 A1 | 12/1981 |
| EP | 0 054 947 A1 | 12/1981 |
| EP | 0 089 794 | 9/1983 |
| EP | 0 448 340 A2 | 9/1991 |
| EP | 0 739 766 | 10/1996 |
| EP | 1 035 258 A1 | 6/1999 |
| EP | 1 035 258 | 9/2000 |
| EP | 2 420 404 | 2/2012 |
| GB | 1 166 258 | 10/1969 |
| GB | 1199577 | 7/1970 |
| GB | 1 383 922 | 2/1974 |
| GB | 2 014 522 | 8/1979 |
| JP | 63220026 A | 9/1988 |
| JP | 1237471 A | 9/1989 |
| JP | 09136611 | 5/1997 |
| JP | 2007 062 539 A | 3/2007 |
| WO | WO 2004/110808 | 12/2004 |

OTHER PUBLICATIONS

Extended European Search Report for parallel European Patent Application No. 11 19 5031, mailed Apr. 5, 2012.

Extended European Search Report for parallel European Patent Application No. 11 19 5039, mailed Apr. 5, 2012.

First Office Action dated Mar. 29, 2012 for Chinese Patent Application No. 201010244916.3, English translation.

Office Action, Chinese Patent Application No. 201110052443.1, dated Dec. 30, 2012, English Translation.

Search Report for European Patent Application No. 11177689.4, mailed Dec. 14, 2011.

* cited by examiner

SPRUNG MULTIPOINT MOUNTING FOR VEHICLE SEAT WITH ELASTOMER SPRING ELEMENT

CROSS REFERENCE TO RELATED APPLICATION

This application claims the benefit of priority from German Patent Application No. 10 2010 045 115.0, filed on Sep. 13, 2010, and German Patent Application No. 10 2010 054 752.2, filed Dec. 15, 2010, which are hereby incorporated by reference in their entireties.

DESCRIPTION

The invention concerns a vehicle oscillation device comprising a sprung multipoint mounting arranged between a vehicle seat or a driver's cab and a base element of a vehicle arranged below, and suitable for rotative springing and/or damping of the vehicle seat and/or driver's cab in relation to the base element.

Passengers and in particular drivers often find themselves in their seats inside the vehicle for several hours with only short breaks. To make this multi-hour seating as comfortable as possible, vehicle seats usually have spring and/or damper systems which are suitable for absorbing or damping out vertical impulses. Such springing systems are often also designed height-adjustable so that the seat height can be adapted to the size and seating habits of the driver or passenger.

In particular in the professional sector, very well sprung vehicle seats are required as the drivers must often sit on such a vehicle seat and work for several hours each day, for many days in succession. Drivers of buses, trains, trucks, tractors, construction vehicles, vehicles from the mining sector and similar, sometimes also ships and aircrafts, in particular are exposed to such stresses. In these professional applications, not only comfort but also working safety plays an important role. In particular the prevention of long-term physical injury to the driver is increasingly recognised as an important quality feature for vehicle seats. A pleasant seating sensation and adequate damping are essential for this.

Usually systems for springing and/or damping the vehicle seat are formed of several parts in order to guarantee the best possible springing and/or damping. Since the start of vehicle construction, systems have been used for springing and/or damping the wheels and/or wheel suspension, for example in the form of gas-filled tyres and/or struts (shock absorbers). In particular for professional applications in buses, railways, trucks, tractors, construction vehicles etc., systems for springing the vehicle seat are also state of the art. Where applicable in addition, springing of entire vehicle parts such as for example the vehicle driver's cab, is also increasingly common.

While the purpose of such springing and damping was initially the springing or damping of vertical movements, increasingly systems are used which are able to absorb and/or damp out movements in the longitudinal and/or transverse direction of the vehicle.

Thus for example DE 10 2005 028 725 A1 discloses a vehicle seat suspension with an omnidirectional buffer element. This buffer element is arranged mobile in all horizontal directions in the centre of a base element of the vehicle seat. It is connected with the base via a multiplicity of suspension elements, and is sprung-mobile in relation thereto.

Publication DE 35 17 345 C2 discloses a springing device with a resilient coil tension spring. The coil tension spring is arranged between stationary suspension elements and is not deformed in its longitudinal direction. The deformation occurs transverse to the alignment of the coil tension spring through two opposite curved elements, the curvature of which extends over several windings of the coil tension spring. On deflection of these elements the coil tension spring is compressed and deformed. With such an arrangement it is possible to achieve non-linear dependencies of the spring force, wherein this non-linear spring force is not specified exclusively by the spring constant of the coil tension spring but also can be influenced by the curved elements to deform the coil tension spring.

In particular in vehicles with a high seating position and a great distance of the seat from one of the axles, amplified impulses occur, such as for example in tractors in which the vehicle seat is usually arranged very high above the rear axle and far removed from the front axle. When the front axle passes over a pothole, strong rotative impulses occur. When the rear axle drops into the pothole, the vehicle floor is lowered which leads to a vertical impulse on the vehicle seat. The lowering of the front axle into the pothole however causes a rotation of the vehicle longitudinal axis about the rear axle by a few degrees. This rotation has a particularly strong effect on objects for remote from the rotation axis. In particular on such a rotation the driver's head accelerates rapidly and moves forward in a radial direction about the rotation axis. Corresponding accelerations can also occur in the radially opposed direction, for example when driving over a kerbing edge.

Such acceleration forces can only be absorbed by means of springing and damping systems which work multi-dimensionally. Such a system should be able to absorb and/or damp out both vertical and horizontal elements of the rotative acceleration and also rotational movements. For example a tilting of the vehicle seat and/or driver's cab in relation to the base element is required for this.

The object of the present invention is therefore to provide a vehicle oscillation device with a sprung multipoint mounting between a vehicle seat or driver's cab and a base element of a vehicle arranged below which is suitable for rotative springing and/or damping of the vehicle seat and/or driver's cab in relation to the base element.

This object is achieved by means of a vehicle oscillation device which has the features of claim 1.

An essential object of the invention is a vehicle oscillation device which comprises a sprung multipoint mounting arranged between a vehicle seat or a driver's cab and a base element of a vehicle arranged below, and which is suitable for rotative springing and/or damping of the vehicle seat and/or driver's cab in relation to the base element, wherein the sprung multipoint mounting is formed of several pieces and comprises at least one elastomer spring element.

Preferably a vehicle oscillation device comprises a sprung multipoint mounting which additionally comprises at least one fluid spring element and/or a fluid damper element (5).

Such a vehicle oscillation device allows in a spacesaving manner a multi-dimensional sprung mounting of a vehicle seat or driver's cab in relation to a base element of a vehicle such that it is suitable for rotative springing and/or damping of the vehicle seat or driver's cab in relation to the base element. The multipiece design allows to combine various springing and/or damping elements within the vehicle oscillation device such that the required springing and/or damping characteristic is achieved.

In a preferred embodiment the fluid spring element is an air spring and/or the fluid damping element is an air bearing. Evidently all other suitable fluids can also be used. In particular e.g. nitrogen can be used as a gas, or oil as a liquid. The comparatively low space requirement and spring force independent of the spring travel are great advantages of such a device. It is also possible to combine the spring and damping mechanism in one element.

In a further preferred embodiment the elastomer spring element is formed such that it is suitable to cushion/absorb/damp both rotative and vertical and/or horizontal movements of the vehicle seat or driver's cab. Thus it is possible that such an elastomer spring element completely replaces conventional spring elements and no further springing and/or damping of the vehicle seat and/or driver's cab in relation to the base element is required. Thus also three-dimensional translational or omnidirectional impulses can be absorbed and such impulses damped out.

Preferably the elastomer spring element in at least one dimension has a cross section which at least in portions has substantially the form of a triangle spanned by two legs, wherein the legs of this triangle run obliquely in relation to a vertical connection between the base element and a underside of the vehicle seat or driver's cab and comprise a material which has elastic properties. The angle at which the legs of the triangle stand in relation to the vertical connection between the base element and the underside of the vehicle seat or driver's cab can be selected variably according to requirements. Different angles can be used to achieve different spring characteristics. The spring travel can also be varied by the choice of angle and the length of the legs.

The legs of these triangles consist of elastomer. The material can be selected according to special requirements. Depending on material selected, harder or softer spring characteristics can be set. The space lying between the triangle legs and the base of the triangle is preferably not filled with an elastomer. Thus in this area there is space into which the triangle legs can be deformed when an impulse to be absorbed occurs.

In the choice of geometry it is also possible for the triangle legs not to be arranged symmetrically in relation to the vertical connection between the base element and the underside of the vehicle seat or driver's cab. By varying the angle in different directions or by the formation of non-isosceles triangles, the spring characteristics can be influenced direction-dependent. Thus for example would be conceivable to damp out movements of the vehicle seat or driver's cab in the driving direction more strongly than movements in the opposite direction of the driving direction. It is also possible to change the angle as a function of the positioning below the vehicle seat or driver's cab. Thus for example a stronger springing force can be achieved in the vicinity of the centre of the underside of the vehicle seat or driver's cab and a weaker springing force in the edge areas. Evidently all conceivable distributions of spring force over the underside of the vehicle seat and/or driver's cab are possible. Thus e.g. a greater spring force is possible in the outer areas in comparison with the spring force applied near the centre.

The spring force however can be varied not only by different angles of the triangle legs in relation to the vertical connection between the base element and the underside of the vehicle seat or driver's cab. It is also possible to select the materials of the individual legs differently. Where applicable, combinations of different materials which may differ in their springing properties within a leg are also possible. Evidently it is also possible to adapt the material thickness of the triangle legs in various areas to the spring strength desired and required there.

It is also possible to combine into larger units several e.g. two of the above elastomer spring elements with a triangular cross section at least in one dimension. In a preferred embodiment the elastomer spring element therefore in at least one dimension has a cross section which at least in portions has substantially the form of the letter W, wherein at least one leg of this W-shaped elastomer spring element is arranged obliquely in relation to a vertical connection between the base element and a underside of the vehicle seat or driver's cab, and comprises a material with elastic properties.

With such an embodiment of the elastomer spring element it is possible, in a single one of these elements, to adapt the spring characteristics further to requirements and by a combination of legs with different spring strength achieve a more precise distribution of spring force over the underside of the vehicle seat or driver's cab.

In principle it is possible to position the elastomer spring elements in any orientation. This orientation is determined solely by the desired springing and/or damping of the vehicle seat or driver's cab. It has however been found that in particular orientations are favourable in which the elastomer spring element is arranged substantially parallel to a plane spanned by the vehicle longitudinal axis and a vertical.

In a preferred embodiment therefore the elastomer spring element is arranged substantially parallel to a plane spanned by a vehicle longitudinal axis or vehicle transverse axis and a vertical. By the variant of the arrangement along the vehicle longitudinal axis, the particularly frequent rotative impulses, namely those occurring by raising or lowering one of the vehicle axles in relation to the other vehicle axle, can be absorbed and/or damped out. In the variant of the elastomer spring element arranged in the vehicle transverse direction, lateral rotative impulses which also frequently occur at the vehicle seat or driver's cab can also be adequately absorbed and/or damped out. Such rotative impulses in the transverse direction of the vehicle for example occur if only one wheel of an axle enters a dip such as for example a pothole. In particular on very high seating positions such as for example in tractors, it is necessary to absorb and/or damp out these rotative impulses in the transverse direction of the vehicle efficiently. For reasons of weight saving and/or restricted space available, it is possible to combine in a single component elastomer spring elements for springing and/or damping rotative impulses in both directions described above. In a preferred embodiment the elastomer spring elements are formed as a cone. These can also efficiently absorb and/or damp out impulses in other directions as well as the vehicle longitudinal axis and vehicle transverse axis. This achieves a more even springing and/or damping even on impulses, the direction vector of which is a compilation of vectors in the direction of the vehicle longitudinal axis and vectors in the direction of the vehicle transverse axis. This is also possible with spherical or oval elastomer spring elements. The term "oval" here designates elastomer spring elements which have an oval cross section in at least one cross section direction. These spherical or oval elastomer spring elements are also suitable for three-dimensional translational or omnidirectional springing and/or damping and therefore constitute preferred embodiments of the invention.

In a further preferred embodiment the sprung multipoint mounting has a multiplicity of, preferably three or four, physically separate elastomer spring elements. These are distributed in a suitable manner along the underside of the vehicle seat or driver's cab so that the adequate spring force acts everywhere on the underside. As already described above, for reasons of weight saving it is sensible to limit the number of elastomer spring elements. In practice a quantity of three or four elastomer spring elements has proved particularly advantageous. These are preferably distributed in the form of a triangle or square over the underside of the vehicle seat or driver's cab such that an even distribution of spring forces is achieved. For vehicle seats, but in particular for larger objects to be sprung such as a driver's cab, it is however evident that the use of more than four elastomer spring elements is also possible.

Also it is advantageous that the sprung multipoint mounting has a multiplicity of, preferably 2, 3 or 4, physically separate fluid spring elements and/or fluid damping elements. Like the elastomer spring elements, these are distributed in a suitable manner over the underside of the vehicle seat or driver's cab so that adequate spring force and/or damping acts on everywhere the underside. This distribution can evidently deviate from the distribution of the elastomer spring elements. 2, 3 or 4 fluid spring elements and/or fluid damping elements have proved particularly advantageous as this number guarantees adequate springing and/or damping without overcomplicating the design and increasing the weight.

In a particular embodiment here a fluid spring element and/or fluid damping element is further removed from a centre of the underside of the vehicle seat or driver's cab than an elastomer spring element. As a result it is possible to arrange a fluid spring element and/or fluid damping element for example on the front and rear edges—in the vehicle longitudinal direction—of the underside of the vehicle seat or driver's cab, whereby a particularly good springing and/or damping occurs of the rotative impulses which occur most frequently, namely the above-mentioned rotative impulses which occur due to a raising or lowering of one of the vehicle axles in relation to the other vehicle axis. To absorb and/or damp out also lateral impulses, two separate fluid spring elements and/or fluid damping elements can be arranged for example on the front or rear edge of the underside of the vehicle seat or driver's cab (3-point mounting). It is furthermore also possible to achieve the springing and/or damping by two separate fluid spring elements and/or fluid damping elements on the edge opposite this edge (4-point mounting).

In a particular embodiment the springing and/or damping properties of a fluid spring element and/or fluid damping element can be adapted to allow an active tilt compensation of the vehicle seat and/or driver's cab. This active tilt compensation allows, on severe tilting of the vehicle seat and/or driver's cab, an increase of the pressure acting on certain fluid spring elements and/or fluid damping elements and thus to achieve a levelling of the vehicle seat or driver's cab. This is particularly useful if tiltings are sustained over a longer periods, as is the case for example on long hill climbs, in mining or in particular applications in agriculture (e.g. viticulture). By means of this tilt compensation, the driver's seating position can be balanced according to the incline of the vehicle. Thus it is possible for the driver to sit almost vertically even if the vehicle chassis is tilted because of steep gradients, for example in vineyards. This is advantageous in particular for applications for rotative springing and/or damping of the driver's cab in relation to the base element, as here too the control elements undergo the same tilt compensation as the driver's seat and thus the control elements remain in the working reach of the driver.

Further advantages, objectives and properties of the present invention are explained below with reference to the following description of the figures which show as an example a vehicle oscillation device according to the invention which comprises a sprung multipoint mounting arranged between a vehicle seat or a driver's cab and a base element of a vehicle arranged below, and designed for rotative springing and/or damping of the vehicle seat and/or driver's cab in relation to the base element, wherein the sprung multipoint mounting is formed of several pieces and comprises at least one fluid spring element and/or fluid damping element and at least one elastomer spring element. Components of the vehicle oscillation device in the figures which at least substantially correspond in their function may be identified here with the same reference numerals, wherein these components need not be referenced or explained in all figures.

Figure 2:
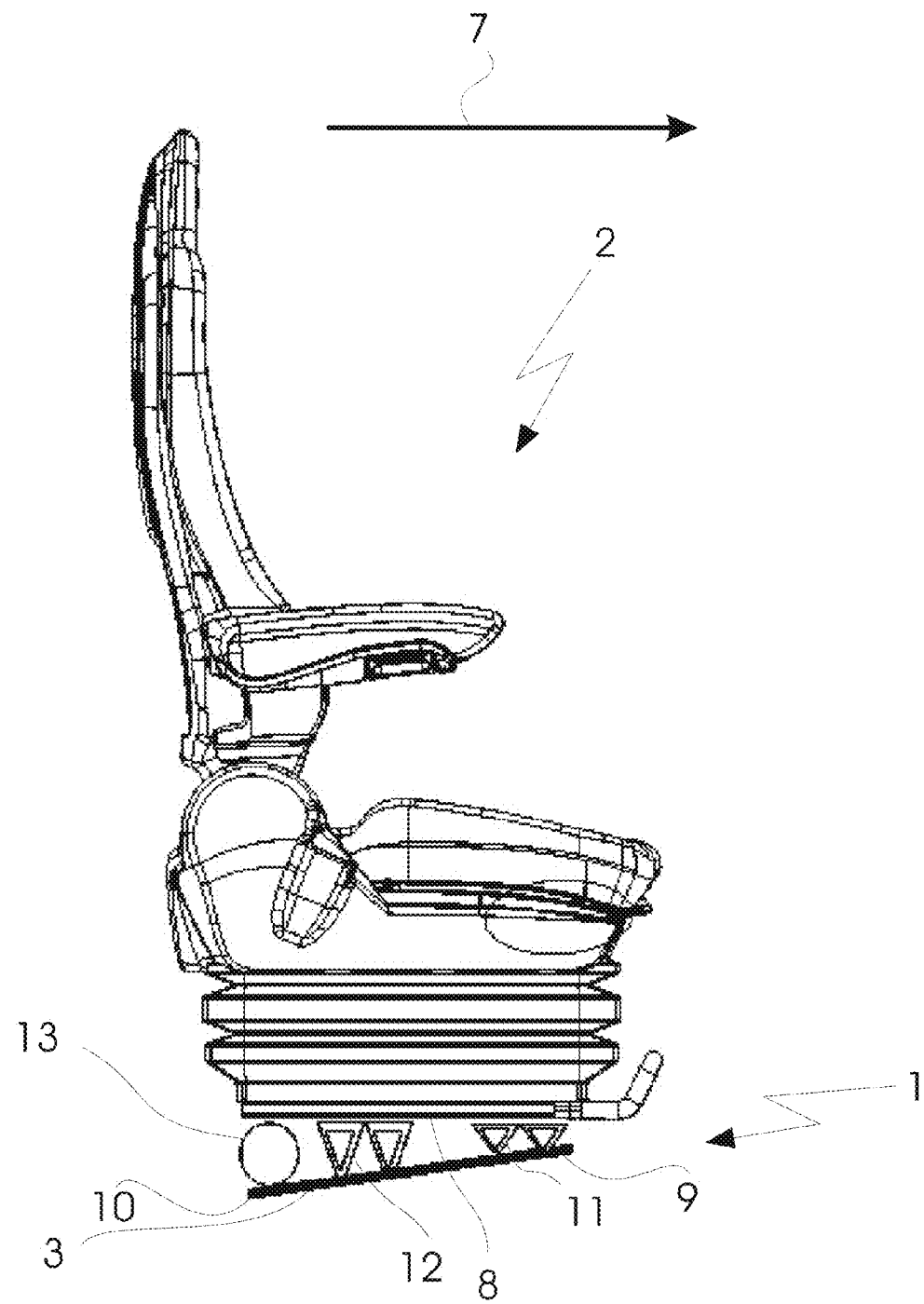
Figure 3:
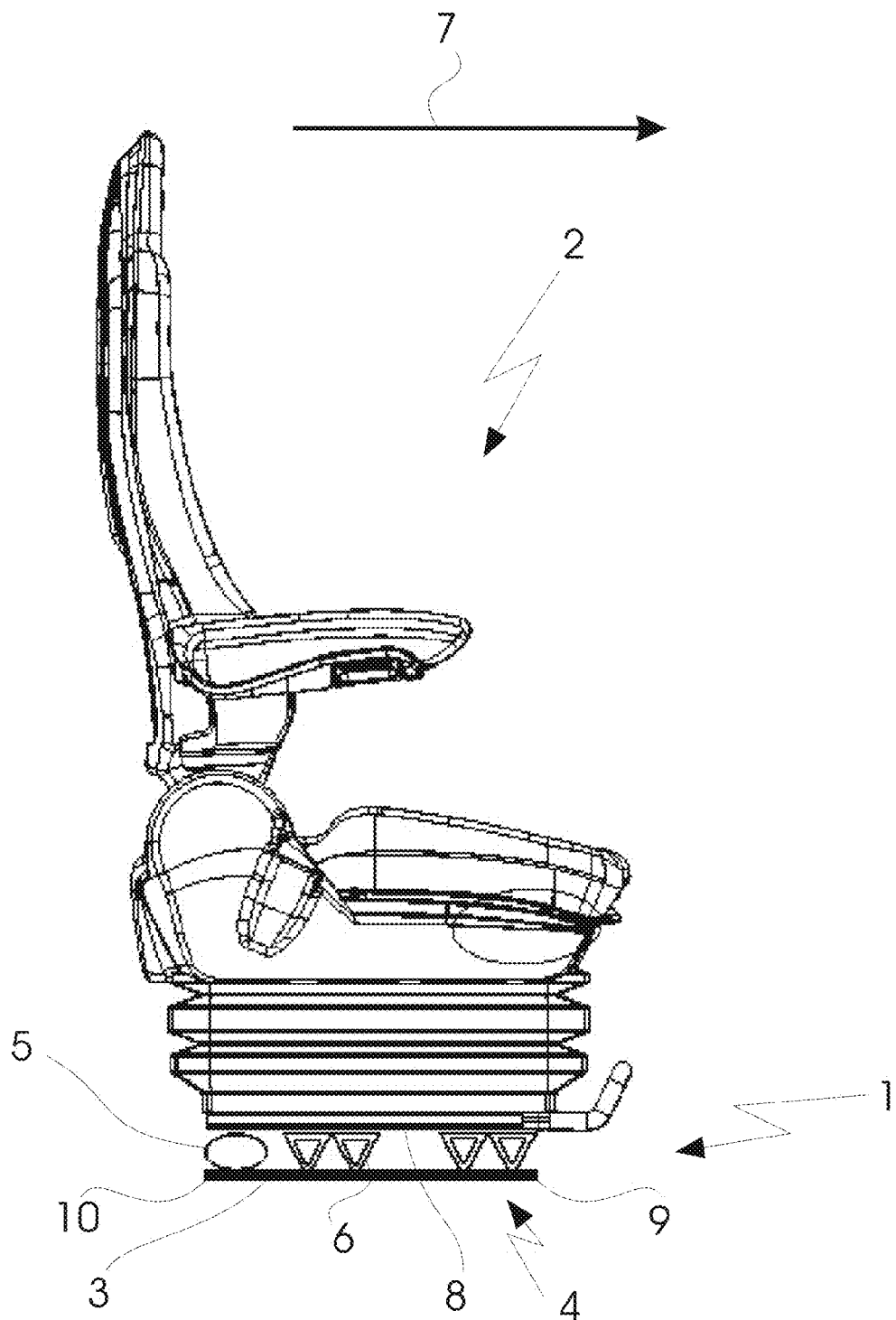
Figure 4:
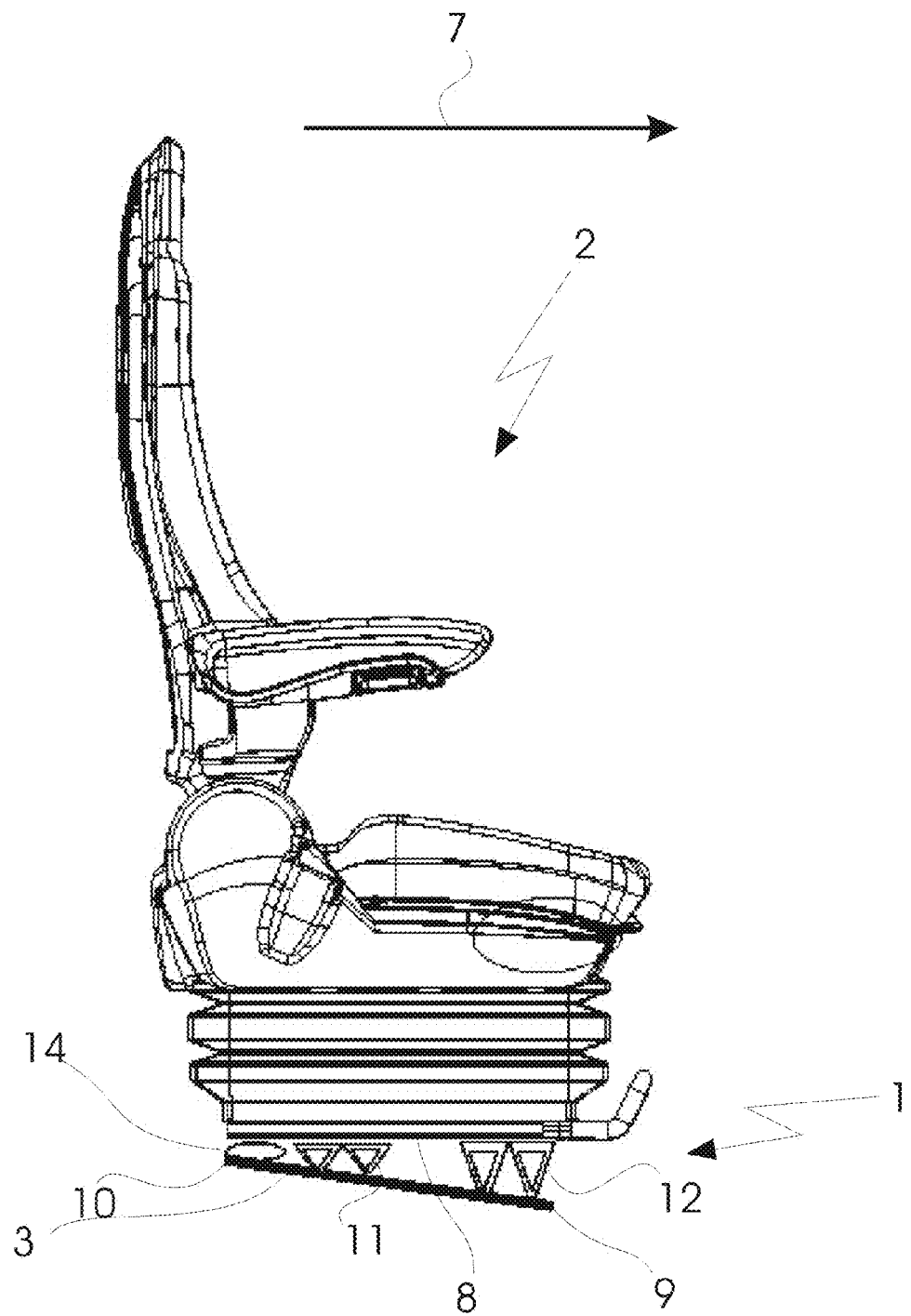
Figure 5:
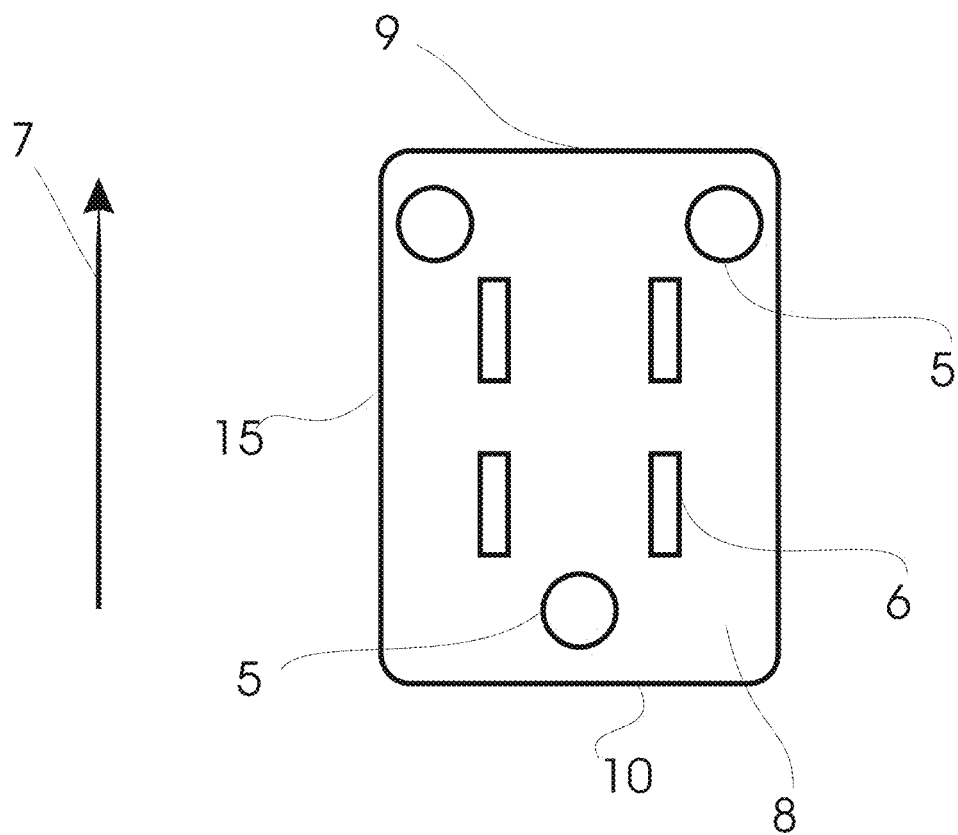
Figure 6:
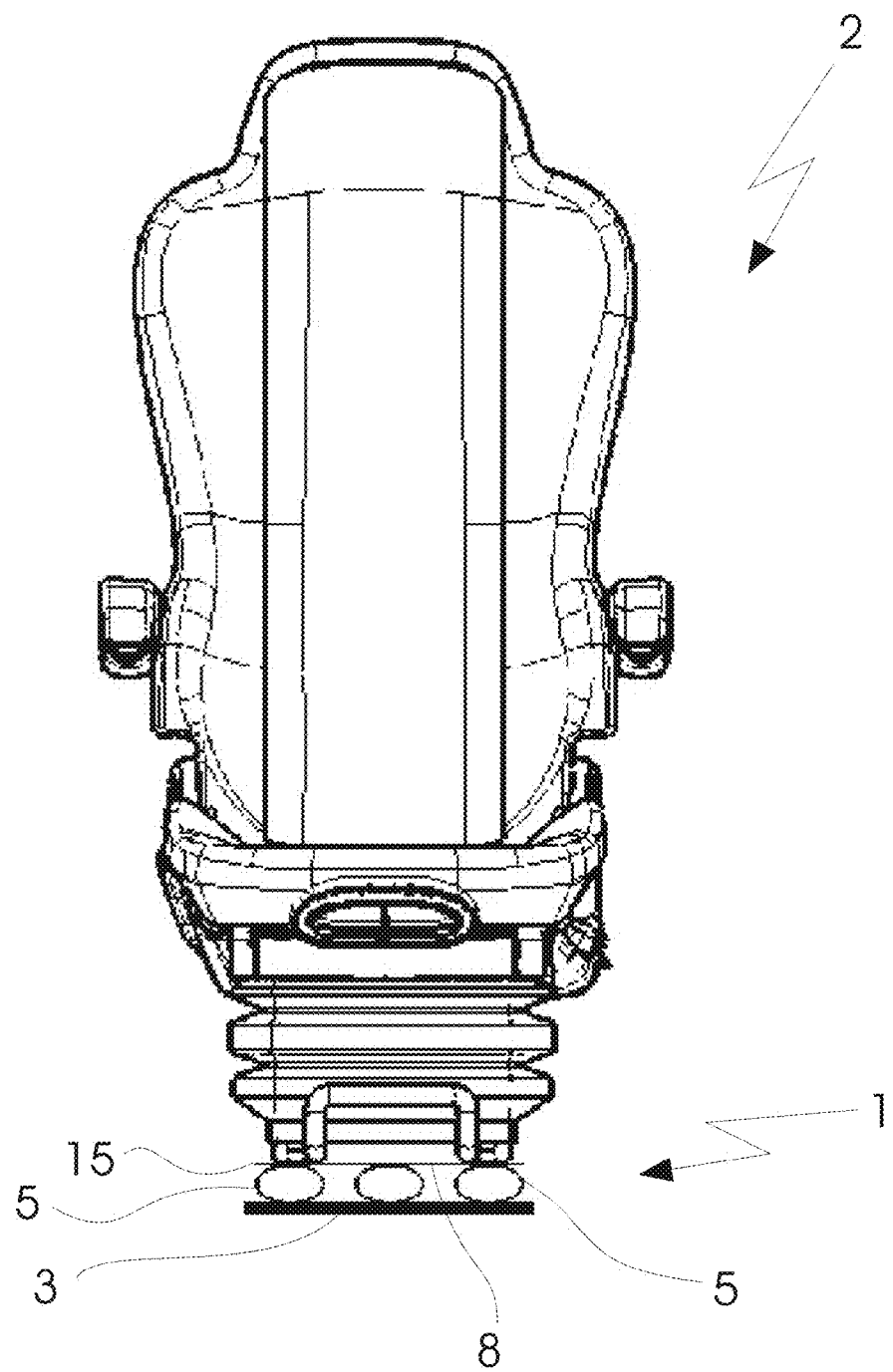
Figure 7:
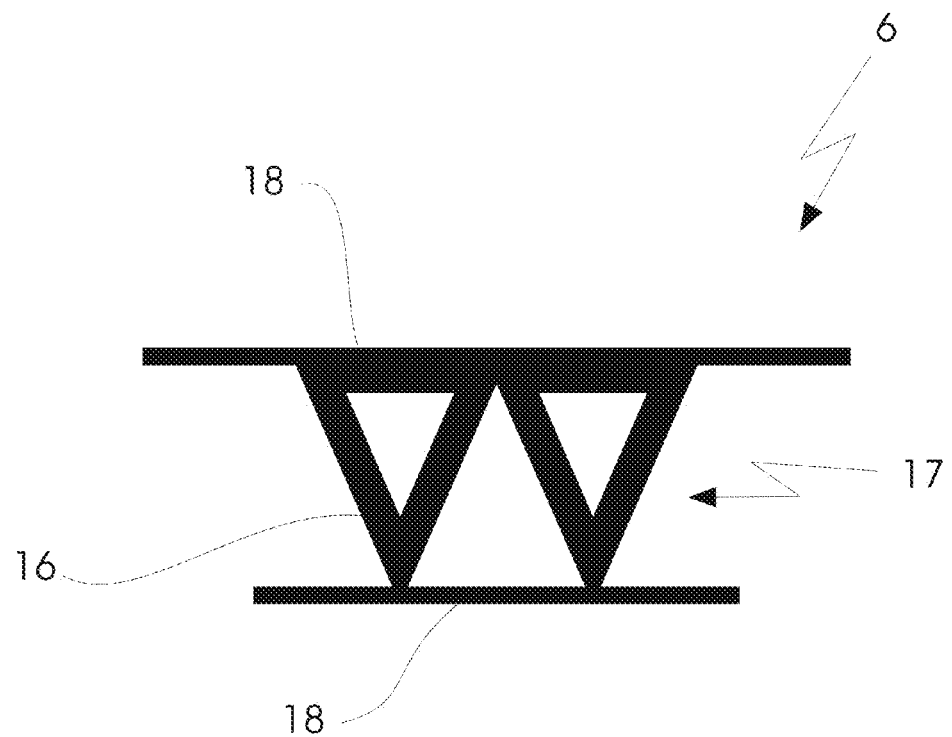

The figures show:

FIG. 1 a side view of a vehicle oscillation device for rotative springing and/or damping of the vehicle seat in rest position;

FIG. 2 a side view of a vehicle oscillation device for rotative springing and/or damping of the vehicle seat in a first deflected position;

FIG. 3 a further side view of a vehicle oscillation device for rotative springing and/or damping of the vehicle seat in rest position;

FIG. 4 a side view of a vehicle oscillation device for rotative springing and/or damping of the vehicle seat in a second deflected position;

FIG. 5 a top view of a possible arrangement of elastomer spring elements and fluid spring elements and/or fluid damping elements within a vehicle oscillation device for rotative springing and/or damping of the vehicle seat;

FIG. 6 a rear view of a vehicle seat with fluid spring elements and/or fluid damping elements; and FIG. 7 a detailed depiction of a substantially W-shaped elastomer spring element.

FIG. 1 shows a side view of a vehicle oscillation device 1 for rotative springing and/or damping of the vehicle seat 2 in a rest position. The vehicle oscillation device 1 shown is arranged between a vehicle seat 2 and a base element 3 of a vehicle arranged below this. It comprises a sprung multipoint mounting 4 comprising fluid spring and/or fluid damping elements 5 and elastomer spring elements 6. As evident from the figure, the fluid spring and/or fluid damping elements 5 are preferably arranged in the region of the front edge 9 and rear edge 10—in the vehicle longitudinal direction 7—of the underside 8 of the vehicle seat 2. The elastomer spring elements 6 are arranged in the region between the fluid spring and/or fluid damping elements 5 but can also be arranged offset to these. In the example shown (each) two triangular elastomer spring elements 6 are combined into one approximately W-shaped elastomer spring element 6. These W-shaped elastomer spring elements 6 are spaced apart, distributed along the underside 8 of the vehicle seat 2.

FIG. 2 shows a side view of a vehicle oscillation device 1 for rotative springing and/or damping of the vehicle seat 2 in a first deflected position. Such a situation occurs for example when climbing hills or driving over an obstacle (e.g. stone, kerbing edge etc.). The base element 3 of the vehicle follows the movement caused by the unevenness of the ground. The vehicle seat 2 remains however largely in its substantially vertical rest position. This results from deformation of the elements of the vehicle oscillation device 1. Elastomer spring elements 11 in the front area of the underside 8 of the vehicle seat 2 are compressed and the distance between the underside 8 of the vehicle seat 2 and the base element 3 of the vehicle is reduced. To illustrate the situation, in this figure no fluid spring and/or fluid damping element 5 is shown in the region of the front edge 9 of the underside 8 of the vehicle seat 2. The elastomer spring elements 12 in the rear area of the underside 8 of the vehicle seat 2 are however expanded and the distance between the underside 8 of the vehicle seat 2 and base element 3 of the vehicle is increased. The fluid spring and/or fluid damping element 13 arranged in the rear edge area 10 also expands.

FIG. 3 shows a side view of a vehicle oscillation device 1 for rotative springing and/or damping of the vehicle seat 2 in rest position. As in FIG. 2, for clearer depiction of the front elastomer spring element 6 no fluid spring and/or fluid damping element 5 is shown in the region of the front edge 9 of the underside 8 of the vehicle seat 2. Otherwise this depiction corresponds to the situation shown in FIG. 1.

FIG. 4 shows a side view of a vehicle oscillation device 1 for rotative springing and/or damping of the vehicle seat 2 in a second deflected position. This situation occurs for example when driving downhill or driving over a recess (e.g. pothole, drainage ditch or similar). As already shown in FIG. 2, the base element 3 of the vehicle follows the movement given by the ground unevenness. In this case however in the opposite direction. Here too the vehicle seat 2 remains largely in its substantially vertical rest position as the elements of the vehicle oscillation device 1 deform. The elastomer spring elements 11 in the rear area of the underside 8 of the vehicle seat 2 are compressed and thus the distance between the underside 8 of the vehicle seat 2 and the base element 3 of the vehicle is reduced. The fluid spring and/or fluid damping elements 14 arranged in the region of the rear edge 10 are also compressed. In contrast the elastomer spring elements 12 in the rear area of the underside 8 of the vehicle seat 2 are expanded, whereby the distance between the underside 8 of the vehicle seat 2 and the base element 3 of the vehicle is increased.

FIG. 5 shows a top view of a possible arrangement of elastomer spring elements 8 and fluid spring elements and/or fluid damping elements 5 within a vehicle oscillation device 1 for rotative springing and/or damping of the vehicle seat 2. As is clear from this depiction, the fluid spring elements and/or fluid damping elements 5 are further remotely arranged from the centre of the underside 8 of the vehicle seat 2 than the elastomer spring elements 6. The fluid spring elements and/or fluid damping elements 5 are preferably located in the region of the outer limits 15 of the underside 8 of the vehicle seat 2. The elastomer spring elements 6 in this depiction are shown as rectangles. The W-shape or triangular shape is not evident in this view. The legs of the triangular or W-shaped elastomer spring elements 6 point obliquely out of the drawing plane in the direction of the viewer. The base line of the triangle runs in the vehicle longitudinal direction 7. To absorb and/or damp out lateral impulses, the elastomer spring elements 6 can also be oriented in other directions than the vehicle longitudinal direction 7. For example orientation in the vehicle transverse direction is possible. Also a combination of elastomer spring elements 6 oriented in the vehicle longitudinal direction 7 with elastomer spring elements 6 oriented in the vehicle transverse direction is conceivable and advantageous in many applications. Thus a 3-dimensional translational or omnidirectional springing and/or damping is possible.

FIG. 6 shows a rear view of a vehicle seat 2 with fluid spring elements and/or fluid damping elements 5. This clarifies the arrangement of the fluid spring and/or fluid damping elements 5. For greater clarity, the elastomer spring elements are not shown. As also evident from this depiction, the fluid spring and/or fluid damping elements 5 are arranged in the region of the outer limits 15 of the underside 8 of the vehicle seat 2 in order to prevent as effectively as possible excessive sloping or tilting in one direction.

FIG. 7 shows a diagrammatic depiction of a substantially W-shaped elastomer spring element. Such a W-shaped elastomer spring element is composed of two substantially triangular elastomer spring elements. In the example shown the two triangular elastomer spring elements are identical isosceles triangles 17. This is not however essential as the thicknesses of the individual legs 16, their materials and angles to the vertical connection between the base element 3 and the underside 8 of the vehicle seat 2 or driver's cab can differ. The elastomer spring elements shown can be connected directly with the base element 3 and the underside 8 of the vehicle seat 2. However as in the example shown, it is also possible for the elastomers not to be directly connected with this but to be first preassembled by arrangement on mounting aids 18 into modules which are easy to install. These mounting aids 18 for example have bores (not shown in the figure) via which a simple connection to the base element 3 and the underside 8 of the vehicle seat 2 can be created.

All features disclosed in the application documents are claimed as essential to the invention where novel individually or in combination in relation to the prior art.

LIST OF REFERENCE NUMERALS

1 Vehicle oscillation device
2 Vehicle seat
3 Base element of a vehicle
4 Sprung multipoint mounting
5 Fluid spring and/or damping element
6 Elastomer spring element
7 Vehicle longitudinal direction
8 Underside of vehicle seat
9 Front edge of underside of vehicle seat
10 Rear edge of underside of vehicle seat
11 Compressed elastomer spring element
12 Expanded elastomer spring element
13 Expanded fluid spring and/or fluid damping element
14 Compressed fluid spring and/or fluid damping element
15 Outer limits of underside of vehicle seat
16 Leg
17 Isosceles triangle
18 Mounting aid

The invention claimed is:

1. A vehicle oscillation device (1) comprising a sprung multipoint mounting (4) arranged between a vehicle seat (2) or driver's cab and a base element (3) of a vehicle arranged below and suitable for rotative springing and/or damping of the vehicle seat (2) and/or driver's cab in relation to the base element (3), wherein the sprung multipoint mounting (4) is formed of several pieces and comprises at least one elastomer spring element (6), and wherein the sprung multipoint mounting (4) comprises at least one separate fluid spring element and/or a fluid damping element (5), wherein the fluid spring element and/or fluid damping element (5) and the elastomer spring element (6) are arranged between the vehicle seat or the driver's cab and the base element (3), and wherein the elastomer spring element (6) in at least one dimension has a cross section which at least in portions has substantially the form of a triangle spanned by two legs (16), wherein the legs (16) of the triangle are arranged obliquely in relation to a vertical connection between the base element (3) and an underside (8) of the vehicle seat (2) or the driver's cab and comprises a material with elastic properties.

2. The vehicle oscillation device (1) according to claim 1, wherein the fluid spring element is an air spring and/or the fluid damping element (5) is an air bearing.

3. The vehicle oscillation device (1) according to claim 1, wherein the elastomer spring element (6) is configured for cushioning/absorbing/damping rotative and vertical and/or horizontal movements of the vehicle seat (2) or driver's cab.

4. The vehicle oscillation device (1) according to claim 1, wherein the elastomer spring element (6) is arranged substantially parallel to a plane spanned by a vehicle longitudinal axis (7) or vehicle transverse axis and a vertical.

5. The vehicle oscillation device (1) according to claim 1, wherein the sprung multipoint mounting (4) comprises a multiplicity of physically separate elastomer spring elements (6).

6. The vehicle oscillation device (1) according to claim 1, wherein the sprung multipoint mounting (4) comprises a multiplicity of physically separate fluid spring elements and/or fluid damping elements (5).

7. The vehicle oscillation device (1) according to claim 1, further comprising a fluid spring element and/or a fluid damping element (5) remotely arranged further from a centre of an underside surface of the vehicle seat (2) or the driver's cab than an elastomer spring element (6).

8. The vehicle oscillation device (1) according to claim 1, further comprising a fluid spring element and/or a fluid damping element (5) adapted in its springing and/or damping properties to allow an active tilt compensation of the vehicle seat (2) or the driver's cab.

9. The vehicle oscillation device (1) according to claim 1, wherein the elastomer spring element (6) is arranged substantially parallel to a plane spanned by a vehicle longitudinal axis (7) or vehicle transverse axis and a vertical.

10. The vehicle oscillation device (1) according to claim 1, wherein the sprung multipoint mounting (4) comprises a multiplicity of physically separate elastomer spring elements (6).

11. A vehicle oscillation device (1) comprising a sprung multipoint mounting (4) arranged between a vehicle seat (2) or driver's cab and a base element (3) of a vehicle arranged below and suitable for rotative springing and/or damping of the vehicle seat (2) and/or driver's cab in relation to the base element (3), wherein the sprung multipoint mounting (4) is formed of several pieces and comprises at least one elastomer spring element (6), and wherein the sprung multipoint mounting (4) comprises at least one separate fluid spring element and/or a fluid damping element (5), wherein the fluid spring element and/or fluid damping element (5) and the elastomer spring element (6) are arranged between the vehicle seat or the driver's cab and the base element (3), and wherein the elastomer spring element (6) in at least one dimension has a cross section which at least in portions has substantially the shape of the letter W, wherein at least one leg (16) of the W-shaped elastomer spring element (6) is oblique in relation to a vertical connection between the base element (3) and an underside (8) of the vehicle seat (2) or the driver's cab and comprises a material with elastic properties.

12. The vehicle oscillation device (1) according to claim 11, wherein the elastomer spring element (6) is arranged substantially parallel to a plane spanned by a vehicle longitudinal axis (7) or vehicle transverse axis and a vertical.

13. The vehicle oscillation device (1) according to claim 11, wherein the sprung multipoint mounting (4) comprises a multiplicity of physically separate elastomer spring elements (6).

\* \* \* \* \*